(12) United States Patent
Sunaga et al.

(10) Patent No.: US 6,545,442 B2
(45) Date of Patent: Apr. 8, 2003

(54) APPARATUS AND METHOD FOR CONTROLLING ROTATION SPEED OF ROTOR OF BRUSHLESS MOTOR

(75) Inventors: Hideki Sunaga, Gunma (JP); Takeshi Ohba, Tochigi (JP); Eiji Takahashi, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 32 days.

(21) Appl. No.: 09/939,574

(22) Filed: Aug. 28, 2001

(65) Prior Publication Data

US 2002/0030463 A1 Mar. 14, 2002

(30) Foreign Application Priority Data

Aug. 29, 2000 (JP) ........................................ 2000-259779

(51) Int. Cl.$^7$ ................................................. H02P 1/24
(52) U.S. Cl. ...................... 318/727; 318/729; 318/811; 318/798
(58) Field of Search ................................. 318/727, 799, 318/798, 811, 807, 805

(56) References Cited

U.S. PATENT DOCUMENTS

| 5,979,194 A | * | 11/1999 | Matsumoto et al. | ........ 68/12.04 |
| 6,415,212 B2 | * | 7/2002 | Nishizaki et al. | ............. 701/41 |
| 6,477,989 B2 | * | 11/2002 | Suzuki et al. | ............. 123/41.1 |

FOREIGN PATENT DOCUMENTS

| JP | 2000-116178 | 4/2000 |
| JP | 2000-116179 | 4/2000 |

* cited by examiner

*Primary Examiner*—Karen Masih
(74) *Attorney, Agent, or Firm*—Foley & Lardner

(57) ABSTRACT

In apparatus and method for controlling a rotation speed of a brushless motor, the rotation speed of the rotor is lowered by a predetermined gradient for the rotation speed of the rotor to be reached to a present target value of the rotation speed of the rotor when the rotor of the motor is rotating at a previous target value of the rotor of the motor previously calculated and the present target value of the rotor of the motor is lower than the previous target value thereof at which the rotor of the motor is rotating. The predetermined gradient is, for example, 100% per unit time.

14 Claims, 5 Drawing Sheets

BM

APPARATUS AND METHOD FOR CONTROLLING ROTATION SPEED OF ROTOR OF BRUSHLESS MOTOR

BACKGROUND OF THE INVENTION

1. Field of the Invention

The present invention relates to apparatus and method for controlling a rotation of a rotor of a brushless motor applicable to a fan speed control of a blowing fan (or ventilating fan) of an automotive air conditioner in accordance with a rotate command signal which commands the rotor of the brushless motor to rotate at a commanded rotation speed.

2. Description of the Related Art

A brushless motor is currently available in a drive source to drive a blowing fan of an automotive air conditioner in which with a permanent magnet as a rotor and with armature windings as a stator a rectifying mechanism is replaced with a magnetic pole sensor and a switching device. The brushless motor receives a drive power supply from a power supply circuit and is controlled by a motor control circuit which is IC (Integrated Circuit) packaged to rotate the blowing fan.

In such a motor control circuit as described above, a pulse train signal having a pulse duty ratio is inputted to the motor control circuit, the pulse train signal is smoothed to detect a voltage level of the pulse train signal and the rotation speed of the fan is determined according to the detected voltage level. Since the pulse train signal is smoothed, even if a short-term noise is included in the pulse train signal, the rotation speed of the fan at which a rotation operation thereof is carried out is not recognized to be zero. Hence, in this motor control circuit, no generation of a restart of the fan during the rotation operation thereof cannot advantageously occur.

SUMMARY OF THE INVENTION

However, in such a previously proposed motor control circuit as described in the BACKGROUND OF THE INVENTION, an external smooth circuit needs to be added to smooth the pulse train signal and the circuit itself requires a high cost. Furthermore, in the previously proposed motor control circuit, a plurality of external smooth circuits are needed to be added in accordance with a frequency of the pulse train signal. In addition, a considerable term for which the pulse train signal is smoothed is needed so that a response characteristic of the blowing fan is not high.

Two Japanese Patent Application First Publications No. 2000-116178 and No. 2000-116189, each of which is published on Apr. 21, 2000, exemplify other previously proposed motor control circuits for controlling the brushless motor for the blowing fan of the automotive air conditioner.

In each of the latter two previously proposed fan motor control circuits, a period of the pulse train signal is detected, a target value of the rotation speed of the blowing fan in accordance with the period of the pulse train signal is determined to control the rotation speed of the blowing fan. Since the period of the pulse train signal is directly detected according to each of the later two previously proposed motor control circuits, the response characteristic of the blowing fan is advantageously fast.

In each of the latter two previously proposed motor control circuits, a fan speed target value calculating circuit to determine a target value Dsfan of the blowing fan on the basis of the pulse train signal is installed. An eight-bit counter is provided in the fan speed calculating circuit so that the target value Dsfan of the rotor rotation speed is determined in a stepwise manner to fall in an integer range between 0 and 255 in accordance with the period of the inputted pulse train signal.

Furthermore, when, in each of the later two previously proposed motor control circuits, a soft start target value calculating circuit is installed which performs a soft start control such that soft start target values Dsfan are sequentially raised with a gradient delay from a time point at which the rotation of the blowing fan is started when the soft start target value Dsfan is raised toward the target value Dfan of the rotation speed of the blowing fan.

In the soft start target value calculating circuit, the soft start target value Dsfan is raised by a gradient of 5%/sec with respect to a maximum rotation speed target value Dfan (100%) for a period of time of 1.5 seconds from the time at which the rotation of the blowing fan is started and, thereafter, is raised by another gradient of 8%/sec after 1.5 seconds have passed. Then, in the soft start target value calculating circuit, the gradient delay is released (viz., the gradient delay is zeroed (0%/sec)) when the soft start target value Dsfan has reached to the target value Dfan. On the other hand, when the blowing fan is stopped from the target value Dfan, such a control that the target value Dfan is lowered without provision of the gradient delay so as to stop the rotation of the blowing fan.

However, in each of the latter two previously proposed motor control circuits in which the duty ratio of the pulse train signal is directly detected and the target value Dfan is determined according to the detected duty ratio, there is a possibility that the target value Dfan of the rotation speed of the blowing fan is recognized to be "0" (zero) if a noise is mixed in the pulse train signal and the noise is included in the period of the pulse train signal. If the target value Dfan of the rotation speed of the blowing fan is recognized to be "0", such the control that the soft start target value Dsfan is lowered is carried out by the soft start target value calculating circuit. When the fan speed target value Dfan is determined according to the subsequently inputted pulse train signal, the soft start control is restarted toward the fan speed target value Dfan. That is to say, in each of the latter two previously proposed motor control circuits, such the re-start phenomenon that the blowing fan is once stopped and the soft start control is started by the soft start target value calculating circuit occurs. Especially, since such a motor control circuit as described above is susceptible to the noise, number of times the re-start phenomenon occurs are increased.

It is, hence, an object of the present invention to provide apparatus and method for controlling the rotation speed of the rotor of the brushless motor applicable to a fan speed control of the blowing fan of an automotive air conditioner which are capable of stably rotating the blowing fan without occurrence of the re-start phenomenon.

The above-described object can be achieved by providing an apparatus for controlling a rotation speed of a brushless motor, comprising: a commanded rotation speed detecting section that detects a commanded rotation speed of a rotor of the brushless motor from an inputted rotate command signal to command the rotor to rotate at the commanded rotational speed; a first target value calculating section that calculates a target value of the rotation speed of the rotor on the basis of the commanded rotation speed of the rotor detected by the commanded rotation speed detecting section; a second target value calculating section that raises the rotation speed of the rotor of the brushless motor by a first gradient for the rotation speed of the rotor to be reached to a present target value of the rotation speed of the rotor presently calculated by the first target value calculating section when the rotor is stopped and the present target value of the rotation speed presently calculated by the first target value calculating section is received so as to perform a soft start control for the rotation of the rotor and lowers the rotation speed of the rotor by a second gradient for the rotation speed of the rotor to be reached to the present target value of the rotation speed of the rotor when the rotor of the motor is rotating at a previous target value of the rotor of the motor previously calculated by the first target value calculating section and the present target value of the rotor of the motor is lower than the previous target value thereof at which the rotor of the motor is rotating; and a rotational drive section that outputs a rotational drive signal to drive the rotor of the motor to be rotated to a switching device to supply a power supply voltage to a stator of the motor in response to the rotational drive signal, the rotational drive signal being generated in accordance with the target value of the rotational speed of the rotor.

The above-described object can also be achieved by providing a method for controlling a rotation speed of a brushless motor, comprising: detecting a commanded rotation speed of a rotor of the brushless motor from an inputted rotate command signal to command the rotor to rotate at the commanded rotational speed; calculating a target value of the rotation speed of the rotor on the basis of the commanded rotation speed of the rotor detected by the commanded rotation speed detecting section; raising the rotation speed of the rotor of the brushless motor by a first gradient for the rotation speed of the rotor to be reached to a present target value of the rotation speed of the rotor presently calculated when the rotor is stopped and the present target value of the rotation speed presently calculated by the first target value calculating section is received so as to perform a soft start control for the rotation of the rotor; lowering the rotation speed of the rotor by a second gradient for the rotation speed of the rotor to be reached to the present target value of the rotation speed of the rotor when the rotor of the motor is rotating at a previous target value of the rotor of the motor previously calculated and the present target value of the rotor of the motor is lower than the previous target value thereof at which the rotor of the motor is rotating; and outputting a rotational drive signal to drive the rotor of the motor to be rotated to a switching device to supply a power supply voltage to a stator of the motor in response to the rotational drive signal, the rotational drive signal being generated in accordance with the target value of the rotational speed of the rotor.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
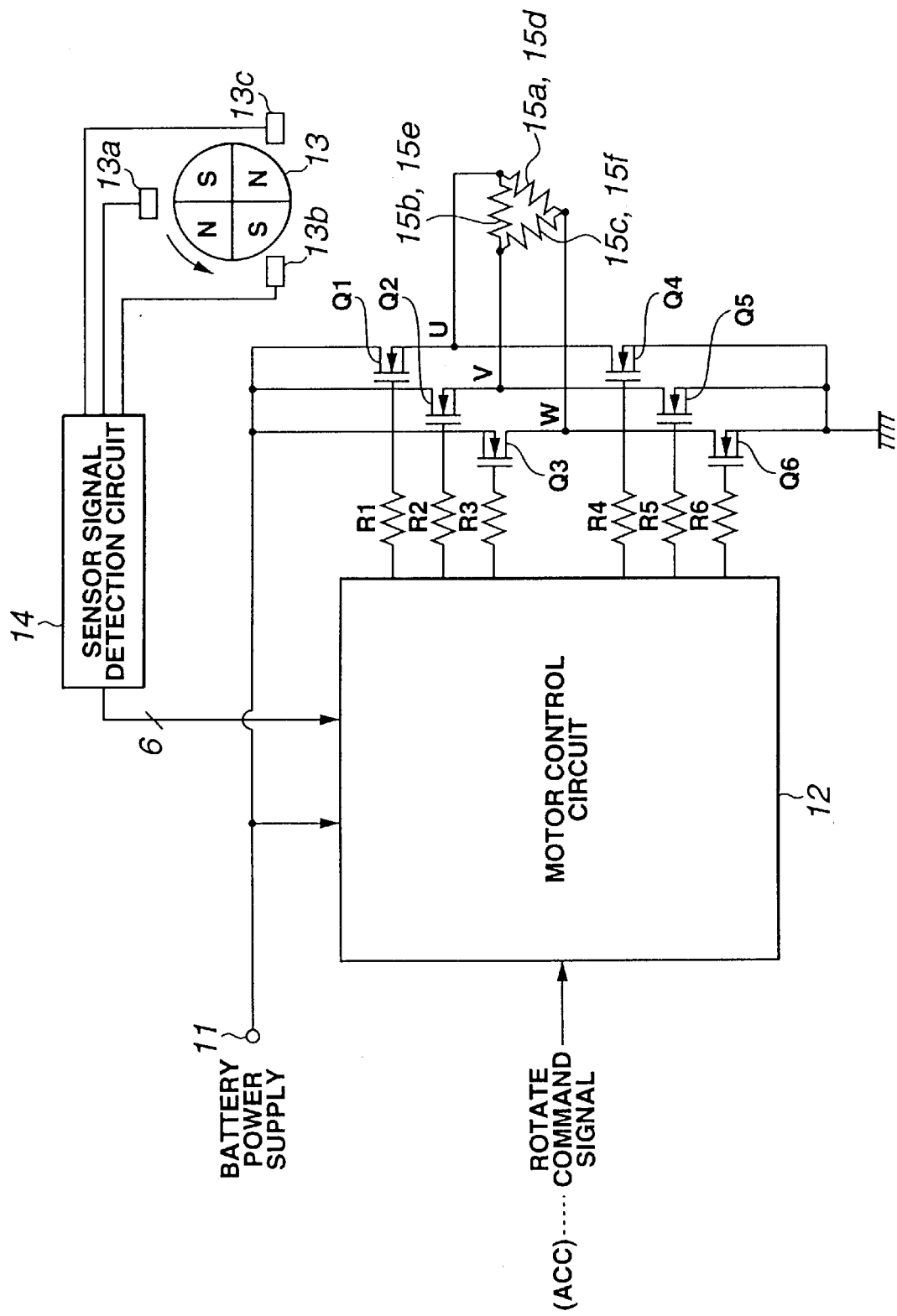
FIG. 1 is a schematic circuit block diagram of an apparatus for controlling a rotation speed of a rotor of a brushless motor in a preferred embodiment according to the present invention.

The present invention is applicable to a brushless motor constructed as shown in FIG. 1.

The brushless motor includes a motor control circuit 12, a sensor which receives a battery power supply from its terminal 11, and a sensor signal detection circuit 14.

Sensor magnet 13 is disposed to indicate a rotational position of a rotor of brushless motor BM and is disposed with two pairs of N (North) and S (South) magnetic poles divided equally into two mutually opposing magnetic poles with respect to a center of rotation of rotor 16.

The sensor magnet 13 is attached onto a shaft rotated integrally together with the rotor. The hall ICs 13$a$, 13$b$, and 13$c$ are disposed at equal intervals of distance each through 120 degrees around an inner periphery of a starter of the motor (refer also to FIG. 6). Sensor signal detection circuit 14 receives detection signals from respective Hall Ics 13$a$ through 13$c$ according to a variation in a magnetic field direction of sensor magnet 13, generates inverted signals using the respective detection signals and supplies six signals of the inverted signals and non-inverted signals to motor control circuit 12.

Motor control circuit 12 refers to the sensor signals from sensor signal detection circuit 14, calculates a rotation speed of a blowing fan FAN (refer also to FIG. 7) of an air conditioner, and compares the calculated rotation speed with the indicated rotation speed of the rotate command signal (PWM signal) to control the rotation speed of blowing fan FAN.

The rotate command signal is a signal to specify the rotation speed of the blowing fan. A duty ratio of the rotate command signal is controlled so that the rotation speed of the blowing fan FAN is specified. That is to say, by varying a percentage (duty ratio) between a signal time duration of logical "H" level and that of logical "L" level, the rotation speed of blowing fan FAN is designated.

The duty ratio of rotate command signal is varied in a normal designation range between 10% and 90% so that, for example, the rotation speed in a range from 0% rotation speed to 100% rotation speed of 100% rotation speed is designated. The rotate command signal provides a high duty ratio signal when the blowing fan is driven by a high rotation speed and provides a low duty ratio signal when the blowing fan is driven at a low rotation speed.

Motor control circuit 12 controls turn on and turn off of MOS FETs (Metal Oxide Semiconductor Field Effect Transistors) Q1 through Q6 on the basis of the sensor signals and switches directions of current flowing through armature coils 15a through 15f by a combination of turned on MOS FETs.

Figure 2:
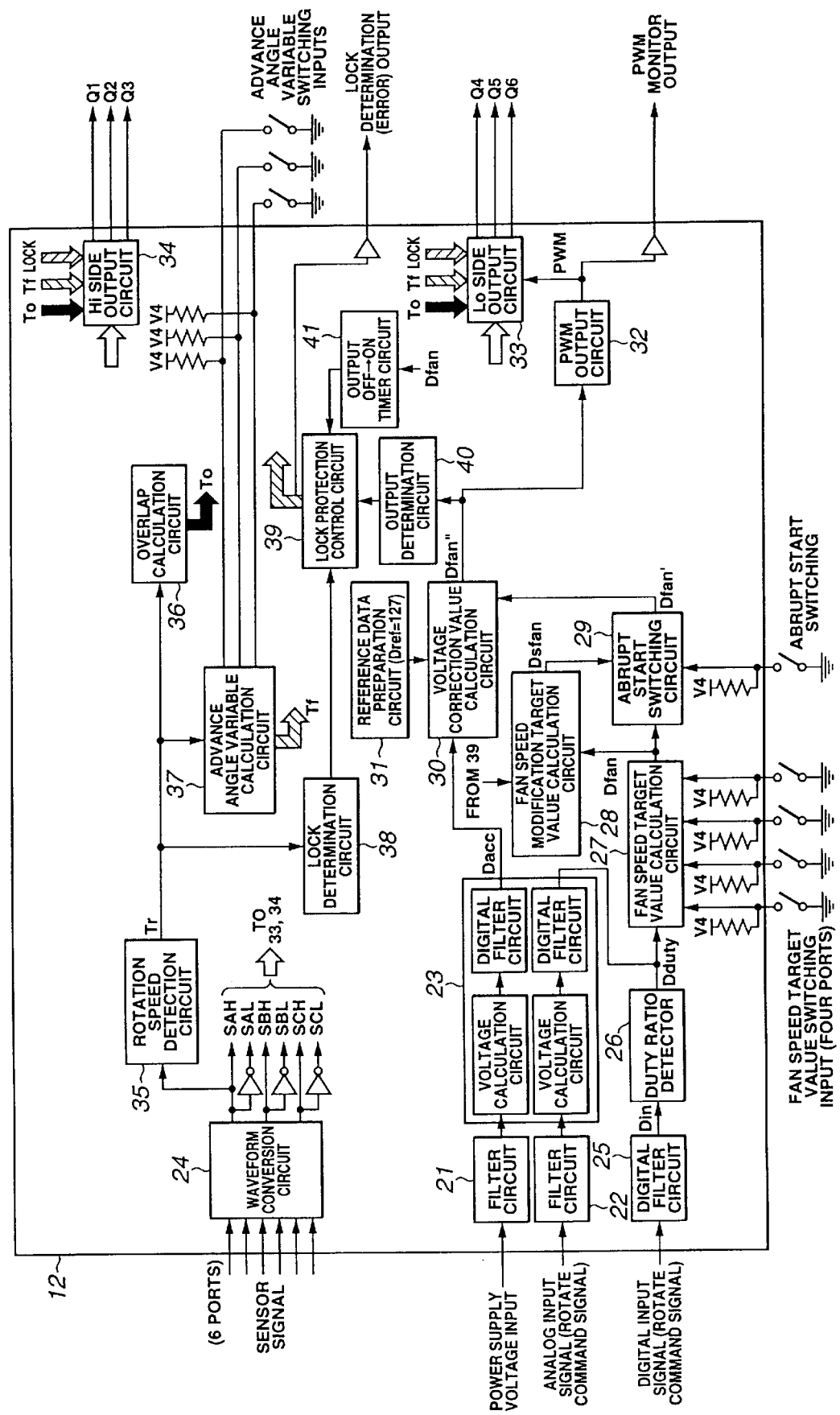
FIG. 2 is a functional block diagram of a motor controller and its peripheral circuit shown in FIG. 1.
Figure 3:
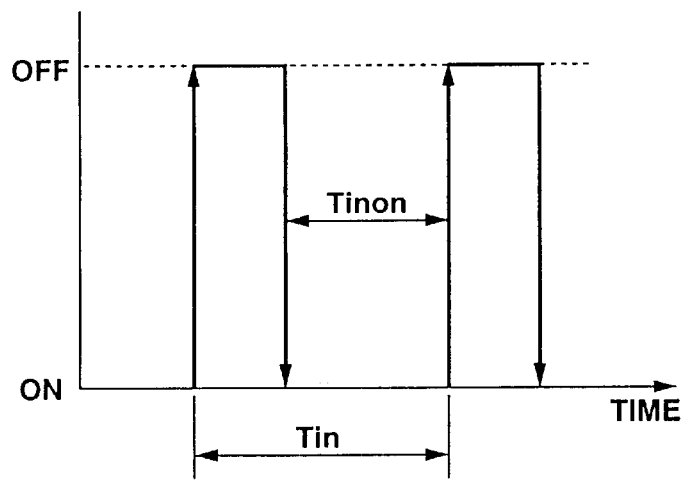
FIG. 3 is a schematic view for explaining a definition of a duty ratio of an inputted rotate command signal in the motor controller shown in FIG. 2.

Next, a detailed construction of motor control circuit 12 will be described below with reference to FIG. 2.

Motor control circuit 12 includes: a first filter circuit 21 which receives a voltage from an external power supply circuit; a second filter circuit 22 which receives the rotate command signal as an analog signal; and an ACC voltage calculating circuit 23.

Motor control circuit 12 filters the power supply voltage (not shown) and supplies the filtered power supply voltage to ACC voltage calculating circuit 23.

ACC voltage calculating circuit 23 divides the power supply voltage and outputs the divided voltage value to a voltage correction value calculation circuit 23 as a data Dacc of eight bits.

Motor control circuit 12 filters the rotate command input signal in the form of an analog signal from an external air conditioning circuit (not shown) through second filter circuit 22 and supplies the filtered rotate command input signal to ACC voltage calculating circuit 23. The rotate command signal in a form of digital signal generated by ACC voltage calculating circuit 23 is supplied to fan speed target value calculating circuit 27.

Motor control circuit 12 includes a waveform conversion circuit 24 into which the sensor signals from sensor signal detection circuit 14 are inputted.

Waveform conversion circuit 24 performs a waveform conversion of the sensor signals from sensor signal detection circuit 14 to provide sensor signals SAH, SAL, SBH, SBL, SCH, and SCL. One of six sensor signals, viz., SAH is supplied to a rotation speed detection circuit 35 and all sensor signals are supplied to a Lo side output circuit 33 and Hi side output circuit 34.

Furthermore, motor control circuit 12 includes: a digital filter circuit 25 to which the rotate command signal in the form of digital signal is inputted; a duty ratio detector 26 to detect the duty ratio of the rotate command signal; a fan speed target value calculating circuit 27; a fan speed modification target value calculating circuit 28; and an abrupt start switching circuit 29.

Motor control circuit 12 filters the rotate command signal in the form of the digital signal from an external air conditioning control circuit (ACC) through digital filter 25 and the filtered rotate command signal is supplied to duty ratio detector 26.

Duty ratio detector 26 detects a pulse signal period Tin by detecting a rising edge or falling edge of the rotate command signal. Duty ratio detector 26 detects a time duration Tion from a time at which the subsequent pulse signal has risen, namely, detects an ON voltage level interval and detects duty ratio Dduty which is a ratio (Tin/Tinon) of the pulse duty ratio Tin to detect time duration(Tin/Tinon). It is noted that the duty ratio Dduty indicates a value of the rotation speed of the blowing fan and is represented by an eight-bit data. Duty ratio detector 26 supplies detected duty ratio Dduty to fan speed target value calculating circuit 27.

Fan speed target value calculating circuit 27 includes a table representing a conversion of duty ratio Dduty to the rotation speed of blowing fan FAN and refers to this table to calculate a fan speed target value Dfan representing the converted rotation speed of the blowing fan. Fan speed target value calculating circuit 27 expresses fan speed target value Dfan in a form of a data of eight bits (0 through 255) and supplies Dfan to fan speed modification value calculating circuit 28 and abrupt start switching circuit 29.

Fan speed modification target value calculating circuit 28 includes a table representing a relationship between the fan speed modification target value Dsfan and a time until the blowing fan is stopped and reached to a fan speed target value Dfan. This fan speed modification target value calculating circuit 28 refers to the table to calculate fan speed modification target value Dsfan with respect to time and supplies fan speed modification target value Dsfan to abrupt start switching circuit 29. Fan speed modification target value calculating circuit 28 sets a gradient delay to raise fan speed to fan speed target value Dfan when the duty ratio is raised from off state (0%) and performs a soft control start.

Fan speed modification target value calculating circuit 28 includes a table representing a relationship between a fan speed modification target value Dsfan used when the fan speed is lowered from the rotation speed target value Dfan while the blowing fan is rotated by rotation speed target value Dfan. The fan speed modification target value calculating circuit 28 sets a gradient delay by referring to the table to supply fan speed modification target value Dsfan with respect to time to abrupt start switching circuit 29.

Abrupt start switching circuit 29 includes a selector which receives fan speed target value Dfan and fan speed modification target value Dsfan and receives externally a Hi (high level) signal or a Lo (low level) signal from an abrupt start input port. With fan speed target value Dfan and fan speed modification target value Dsfan inputted, Hi signal or Lo signal is inputted from an external abrupt start switching input port into abrupt start switching circuit 29.

When Hi signal is inputted through abrupt start input port, fan speed target value Df an from fan speed target value calculating circuit 27 is directly outputted to voltage correction value calculating circuit 30 as a selected target value Dfan'. When Lo signal is inputted through abrupt start input port, abrupt start switching circuit 29 sets fan speed modification target value calculation circuit 28 to be selected target value Dfan' and outputs this Dfan' to voltage correction value calculation circuit 30.

Motor control circuit 12 includes voltage correction value calculating circuit 30 reference data preparation circuit 31, a PWM (Pulse Width Modulation) output circuit; a Lo side output circuit 33; and a Hi side output circuit 34.

Reference data preparation circuit 31 prepares a reference data Dref expressing a magnitude of a center voltage of a power supply voltage of a brushless motor itself and supplies reference data Dref to voltage correction value calculation circuit 30. Voltage correction value calculating circuit 30 detects a ratio between reference data preparation circuit 341 and voltage input data Dacc, corrects target value Dfan' from detected percentage, and generates a correction value Dfan" represented in a 8-bit data. That is to say, voltage correction value calculation circuit 30 calculates a correction value Dfan" represented by the 8-bit data as follows: (Dref/Dacc)·Dfan'=Dfan".

PWM output circuit 32 outputs duty ratio of correction value Dfan" at the period corresponding to 8 bits to Lo side output circuit 32 and external PWM monitor (not shown).

Motor control circuit 12 further includes: an engine speed detector 15; an overlap calculation circuit 36; an advance angle variable calculation circuit 37; a lock determination circuit 38; a lock protection control circuit 39; an output determination circuit 40; and an output ON/OFF timer circuit 41.

Since rotation speed detection circuit 35 has the number of magnetic poles on sensor magnet 13 of two, two periods correspond to one period of the rotor.

Whenever the count for the rotation of rotor is incremented by one for two periods of sensor magnet 13, a rotational period Tr of the rotor is detected.

Rotation speed detection circuit 35 supplies the detected rotational period Tr to overlap calculation circuit 36; an advance angle variable calculation circuit 37; and Lo side output circuit 34 and a Hi side output circuit 33.

Overlap calculation circuit 36 determines an overlap quantity To on the basis of rotation period Tr. Overlap calculation circuit 36 has a table corresponding to overlap quantity To for rotational period Tr and refers to this table to determine overlap quantity To.

Overlap calculation circuit 36 outputs the determined overlap variable To to Lo side output circuit 33 and an Hi side output circuit 33.

Advance angle variable calculation circuit 37 determines an advance angle time Tf to perform an advance angle control on the basis of rotation period Tr. Advance angle variable calculation circuit 37 has a table corresponding to the advance angle time Tf with respect to rotational period Tr and refers to this table to determine advance angle time Tf. Advance angle variable calculation circuit 37 outputs determined advance angle time Tf to Lo side output circuit 33 and Hi side output circuit 34 and supplies external advance angle switching input terminal.

Lock determination circuit 38 outputs Hi signal to lock protection control circuit 39 as a lock determination signal if rotation period Tr is equal to or longer than a predetermined period Tpre. If Tr<Tpre, lock determination circuit 38 outputs Lo signal to lock protection control circuit 39.

Output determination circuit 40 outputs Lo signal to lock protection control circuit 39 when target value Dfan' from voltage correction value calculation circuit 30 is received and target value Dfan" is turned to "0" and outputs Hi signal when target value Dfan" is not zero ("0") to lock protection control circuit 39.

Output on/off timer circuit 41 receives fan speed target value Dfan from fan speed target value calculation circuit 27. When fan speed target value Dfan is raised from zero ("0"), the count is started. When a predetermined time has passed, the signal is outputted to lock protection control circuit 39 as an output on/off timer signal.

Lock protection control circuit 39 is constituted by a logical AND gate receiving the lock determination signal, output determination signal, and output on/off timer signal. When all of these signals are at high levels, a lock protection control signal of Hi signal indicating that the output is stopped is generated. On the other hand, lock protection control circuit 39 generates lock protection control signal of Lo signal representing an output operation when any one of the lock determination signals, output determination signal, and output on/off timer signal is Lo signal. Lock protection control circuit 39 outputs the lock determination signal to Lo side output circuit 33, Hi side output circuit 34, and externally and outputs the lock protection control signal to fan speed modification target value calculation circuit 28.

Lo side output circuit 33 and Hi side output circuit 34 opens or closes MOS FETs Q1 through Q6 on the basis of sensor signals overlap quantity Lo, rotation period Tr, and lock protection control signal.

Next, an operation of fan speed modification target value calculation circuit 28 will be described below.

Figure 4A:
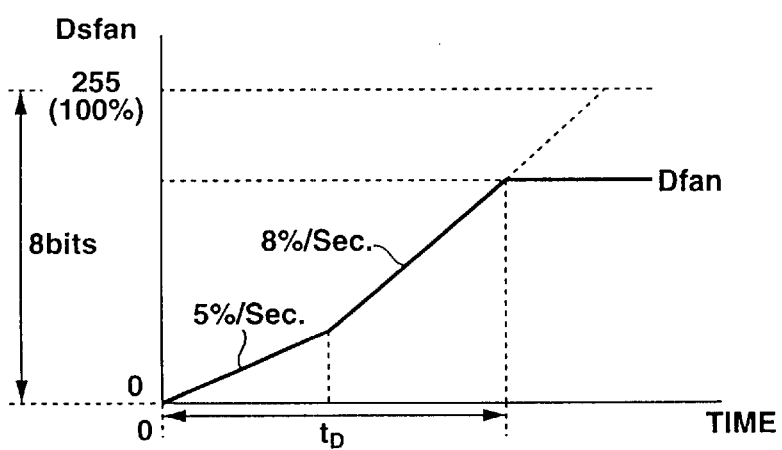
FIG. 4A is a characteristic graph representing an example of relationships between a first fan speed modification target value Dsfan and a time and between the first fan speed modification target value Dsfan and a fan speed target value Dfan in a case of a soft start control carried out by the motor controller shown in FIG. 2.
Figure 4B:
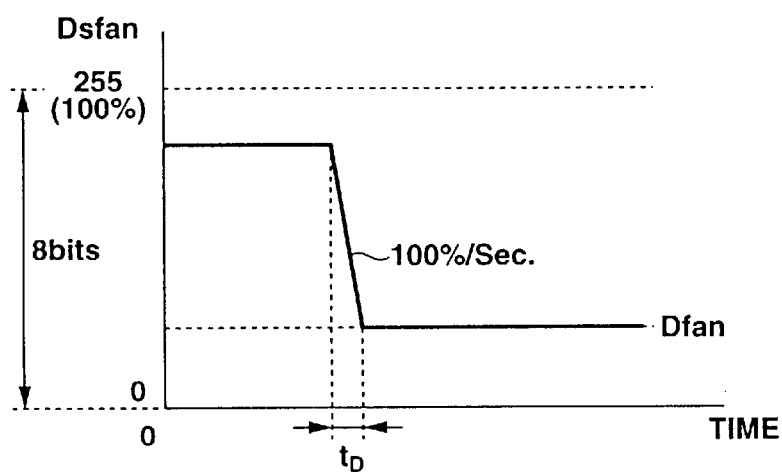
FIG. 4B is a characteristic graph representing an example of relationships between a second fan speed modification target value Dsfan and a time and between the second fan speed modification target value Dsfan and a fan speed target value Dfan in a case of a lowering of the target value Dfan control carried out by the motor controller shown in FIG. 2.
Figure 5A:
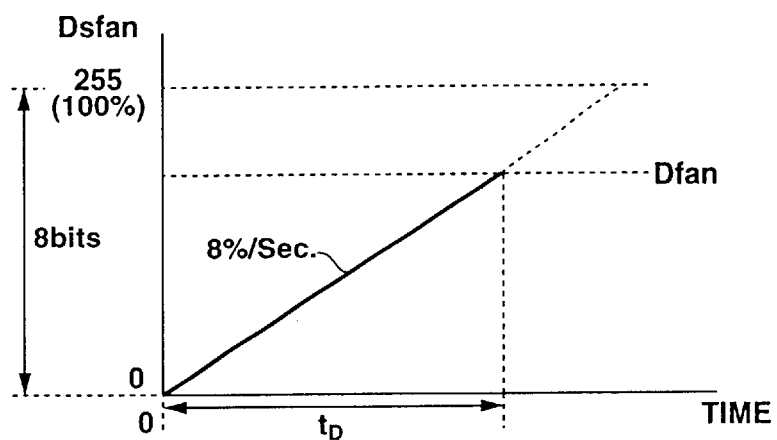
FIG. 5A is a characteristic graph representing an example of relationships between a first fan speed modification target value Dsfan and a time and between the first fan speed modification target value Dsfan and a fan speed target value Dfan in a case of the soft start control carried out by the motor controller shown in FIG. 2.
Figure 5B:
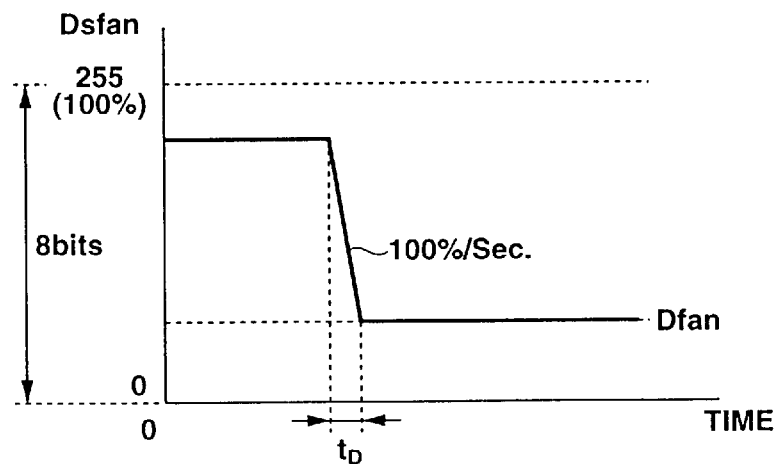
FIG. 5B is a characteristic graph representing the example of relationships between a second fan speed modification target value Dsfan and a time and between the second fan speed modification target value Dsfan and a fan speed target value Dfan in a case of the lowering of the target value Dfan control carried out by the motor controller shown in FIG. 2.

Fan speed modification target value calculation circuit 28 sets fan speed modification target value Dsfan to a high value or low value gradually to reach to the fan speed target value Dfan by either characteristics shown in FIGS. 4A and 4B or those shown in FIGS. 5A and 5B when fan speed target value Dfan from fan speed target value calculation circuit 27 is inputted. Fan speed modification target value calculation circuit 28 generates fan speed modification target value Dsfan so as to modify gradually target value Dfan" while the fan speed reaching from 0% fan speed modification target value Dsfan to fan speed target value Dfan.

As shown in FIG. 4A, fan speed modification target value calculation circuit 28 raises fan speed modification target value Dsfan gradually by 5%/Sec for 1.5 seconds from a time point at which the drive of the blowing fan is started from 0% and raises Dsfan gradually by 8%/Sec after 1.5 seconds have passed. Fan speed modification target value calculation circuit 28 ends the soft start control when the fan speed reaches to fan speed target value Dfan. Thus, fan speed modification target value calculation circuit 28 raises fan speed modification target value Dsfan with gradients from the start to fan speed target value Dfan so that a delay time tD can be provided to reach to fan speed target value Dfan in the rising direction. On the other hand, as shown in FIG. 4B, fan modification target value calculation circuit 28 lowers fan speed modification target value Dsfan at the gradient 100%/Sec when fan speed target value Df an is inputted from fan speed target value Dfan when fan speed target value Dfan of "0" is received from fan speed target value calculation circuit 27 when the blowing fan is rotating at fan target value Dfan. Thus, fan speed modification target value calculation circuit 28 lowers fan speed target value Dfan by the gradient corresponding to fan speed target value Dsfan until it reaches to fan speed target value Dfan and can provide a delay time $t_D$ until the previous Dfan has reached to the present target value of rotation speed of rotor Dfan in a lowering direction.

As shown in FIG. 5A, fan speed modification target value calculation circuit 28 raises fan speed modification target value Dsfan at gradient of 8%/Sec from the start time of 0% and ends the soft start control when Dsfan has reached to Dfan. Fan speed modification target value Dfan at the gradient of fan modification target value Dfan so that the delay time tD in the rising direction can be given.

On the other hand, fan speed modification target value calculation circuit 28 lowers the fan speed from the previous fan speed target value Df an by the gradient corresponding to the fan speed modification target value Dsfan of 100%/Sec, as shown in FIG. 5B, when the fan speed target value Dfan of "0" is received from fan speed target value calculation circuit 27 so that the delay time $t_D$ can be given in the lowering direction.

The gradient prepared in the fan speed modification target value calculation circuit 28 may not be limited to 100%/Sec, That is to say, the gradient of the fan speed modification target value in the lowering direction may be determined within a range such that the blowing fan is stopped immediately upon the stop of fan motor, with the stop of brushless motor BM taken into consideration. In such a brushless motor BM as described above, fan speed modification target value calculation circuit 28 does not start the soft start control even if fan speed target value Dfan as zero "0". That is to say, since the gradient in the lowering direction is provided in the brushless motor, the fan speed target value does not indicate zero with the normal fan speed target value Dfan detected at the subsequent rotate command signal Dduty even if fan speed modification target value calculation circuit 28 detects that the rotate command signal is temporarily zeroed due to the noise.

The brushless motor control circuit 12, in the preferred embodiment, can prevent the occurrence of the re-start phenomenon which would be generated at fan speed modification target value calculation circuit 28 according to the detection that the fan speed target value Dfan is detected to be zero "0" and can stably rotate the blowing fan.

In addition, since, the delay time tD is provided for each of the rising direction and lowering direction, an abrupt acceleration/deceleration of the fan speed can be eliminated when the fan speed of blowing fan is raised or lowered and a load applied to MOS FETs Q1 through Q6 can be reduced. A probability of generating breakages in MOS FETs Q1 and Q2 due to excessive current flow can be reduced.

Figure 6:
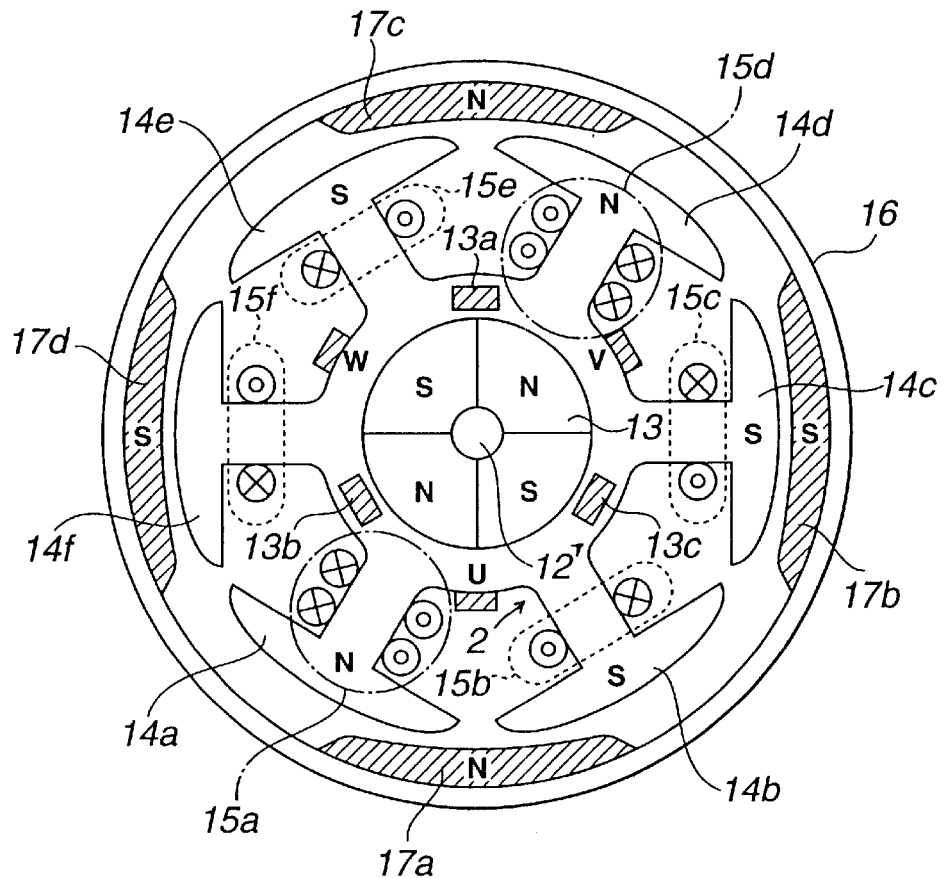
FIG. 6 is a schematic view of an example of a structure of a brushless motor to which the rotor rotation speed controlling apparatus shown in FIG. 1 is applicable.

It is noted that FIG. 6 shows a structure of the brushless motor BM whose sensor magnets 13, 13*a*, 13*b*, and 13*c* and armature windings 15*a* through 15*f* are shown in FIG. 1. A reference numeral 16 denotes the rotor having two pairs of permanent magnets of N and S poles 17*a*, 17*b*, 17*c*, 17*d*, 17*e*, and 17*f* on an inner peripheral wall of rotor 16. A reference numeral 12' denotes a shaft of stator 2 onto which the sensor magnets of 13, 13*a*, 13*b*, and 13*c* are attached. Six projecting poles 14*a*, 14*b*, 14*c*, 14*d*, 14*e*, and 14*f* are projected from stator 2. The six delta connection form armature windings 15*a*, 15*b*, 15*c*, 15*d*, 15*e*, and 15*f* are wound on respective projecting poles 14*a* through 14*f*. Symbols u, v, and w shown in FIG. 6 denote three-phase terminal portions as shown in FIG. 1. It is also noted that R1 through R6 shown in FIG. 1 denote six resistors.

Figure 7:
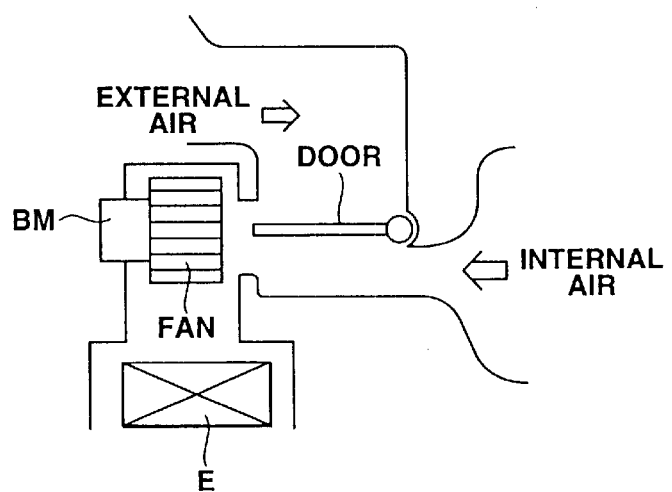
FIG. 7 is a schematic view of an example of a blowing fan attached onto the rotor of the brushless motor to which the rotor rotation speed controlling apparatus shown in FIG. 1 is applicable.

It is also noted that FIG. 7 shows an example of the application of the rotor rotation speed controlling apparatus to the blowing fan FAN attached on rotor 16 of the brushless motor BM shown in FIGS. 1 and 6. The blowing fan FAN is installed within an air duct of the air conditioner of an automotive vehicle as shown in FIG. 7. In FIG. 7, a symbol E denotes an evaporator and a symbol DOOR denotes an air mixing door for mixing the air from an external air (external to a passenger compartment of the vehicle) or from an internal air (in the passenger compartment). It is also noted that (ACC) in FIG. 1 denotes an air conditioner controller.

The entire contents of a Japanese Patent Application No. 2000-259779 (filed in Japan on Aug. 29, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An apparatus for controlling a rotation speed of a brushless motor, comprising:

a commanded rotation speed detecting section that detects a commanded rotation speed of a rotor of the brushless motor from an inputted rotate command signal to command the rotor to rotate at the commanded rotational speed;

a first target value calculating section that calculates a target value of the rotation speed of the rotor on the basis of the commanded rotation speed of the rotor detected by the commanded rotation speed detecting section;

a second target value calculating section that raises the rotation speed of the rotor of the brushless motor by a first gradient for the rotation speed of the rotor to be reached to a present target value of the rotation speed of the rotor presently calculated by the first target value calculating section when the rotor is stopped and the present target value of the rotation speed presently calculated by the first target value calculating section is received so as to perform a soft start control for the rotation of the rotor and lowers the rotation speed of the rotor by a second gradient for the rotation speed of the rotor to be reached to the present target value of the rotation speed of the rotor when the rotor of the motor is rotating at a previous target value of the rotor of the motor previously calculated by the first target value calculating section and the present target value of the rotor of the motor is lower than the previous target value thereof at which the rotor of the motor is rotating; and a rotational drive section that outputs a rotational drive signal to drive the rotor of the motor to be rotated to a switching device to supply a power supply voltage to a stator of the motor in response to the rotational drive signal, the rotational drive signal being generated in accordance with the target value of the rotational speed of the rotor.

2. An apparatus for controlling a rotation speed of a brushless motor as claimed in claim 1, wherein the commanded rotation speed detecting section comprises a duty ratio detecting section that detects a duty ratio (Dduty) of the inputted rotate command signal, the duty ratio of the inputted rotate command signal representing the commanded rotation speed of the rotor, and the first target value calculating section comprises a fan speed target value calculating section that calculates a fan speed target value (Dfan) representing the first target value of the rotation speed of the rotor from the detected duty ratio of the rotate command signal.

3. An apparatus for controlling a rotation speed of a brushless motor as claimed in claim 2, wherein the second target value calculating section comprises a fan speed modification target value calculation circuit to calculate a first fan speed modification target value Dsfan with respect to a unit time when a previously detected duty ratio of the previously inputted rotate command signal is 0% and a presently detected duty ratio of the presently inputted rotate command signal is increased from the previously detected duty ratio of the previously inputted rotate command signal, the first fan speed modification target value corresponding to the first gradient; an abrupt start switching unit which selectively outputs the target value of the rotation speed of the rotor (Dfan) or the first fan speed modification target value (Dsfan) depending on a logical value of an external abrupt start signal as a selected fan speed target value (Dsfan'); and a voltage correction value calculation circuit to detect a ratio of a reference data (Dref) representing a magnitude of a center voltage of a power supply voltage of the motor to a voltage input data (Dacc) from a power supply voltage input (Dref/Dacc) and outputs the corrected target value of the fan speed (Dref/Dacc×Dsfan'=Dsfan") to the switching device in the form of the rotational drive signal.

4. An apparatus for controlling a rotation speed of a brushless motor as claimed in claim 3, wherein the fan speed target value calculating circuit calculates a second fan speed modification target value (Dsfan) with respect to the unit time when the previously detected duty ratio of the previously inputted rotate command signal is in excess of 0% and the presently detected duty ratio of the presently inputted rotate command signal is lower than the previously detected duty ratio of the previously inputted rotate command signal, the second fan speed modification target value (Dsfan) with respect to the unit time corresponding to the second gradient.

5. An apparatus for controlling a rotation speed of a brushless motor as claimed in claim 4, wherein each of the first and second fan speed modification target values (Dsfan) and the fan speed target value (Dfan) is represented by an predetermined bit string.

6. An apparatus for controlling a rotation speed of a brushless motor as claimed in claim 1, wherein the second gradient corresponds to a predetermined duty ratio of an on duration of the rotational drive signal in a form of a pulse signal per unit time.

7. An apparatus for controlling a rotation speed of a brushless motor as claimed in claim 6, wherein the second gradient is 100%/Sec.

8. An apparatus for controlling a rotation speed of a brushless motor as claimed in claim 3, wherein the rotor of the motor is linked to a fan portion of a blowing fan installed in an air duct of a vehicular air conditioner and wherein the rotation speed of the rotor corresponds to a fan speed of the blowing fan.

9. An apparatus for controlling a rotation speed of a brushless motor as claimed in claim 8, wherein the rotate command signal is inputted from an air conditioner controller to the commanded rotation speed detecting section.

10. A method for controlling a rotation speed of a brushless motor, comprising:

detecting a commanded rotation speed of a rotor of the brushless motor from an inputted rotate command signal to command the rotor to rotate at the commanded rotational speed;

calculating a target value of the rotation speed of the rotor on the basis of the detected commanded rotation speed of the rotor;

raising the rotation speed of the rotor of the brushless motor by a first gradient for the rotation speed of the rotor to be reached to a present target value of the rotation speed of the rotor presently calculated when the rotor is stopped and the present target value of the rotation speed presently calculated is received so as to perform a soft start control for the rotation of the rotor;

lowering the rotation speed of the rotor by a second gradient for the rotation speed of the rotor to be reached to the present target value of the rotation speed of the rotor when the rotor of the motor is rotating at a previous target value of the rotor of the motor previously calculated and the present target value of the rotor of the motor is lower than the previous target value thereof at which the rotor of the motor is rotating; and outputting a rotational drive signal to drive the rotor of the motor to be rotated to a switching device to supply a power supply voltage to a stator of the motor in response to the rotational drive signal, the rotational drive signal being generated in accordance with the target value of the rotational speed of the rotor.

11. A method for controlling a rotation speed of a brushless motor as claimed in claim 10, wherein, when detecting the commanded rotation speed of the rotor, a duty ratio (Dduty) of the inputted rotate command signal is detected, the duty ratio of the inputted rotate command signal representing the commanded rotation speed of the rotor, and, when calculating the first target value, a fan speed target value (Dfan) representing the first target value of the rotation speed of the rotor is calculated from the detected duty ratio of the inputted rotate command signal.

12. An apparatus for controlling a rotation speed of a brushless motor as claimed in claim 11, wherein, when calculating a fan speed modification target value, a first fan speed modification target value (Dsfan) with respect to a unit time is calculated when a previously detected duty ratio of the previously inputted rotate command signal is 0% and a presently detected duty ratio of the presently inputted rotate command signal is increased from the previously detected duty ratio of the previously inputted rotate command signal, the first fan speed modification target value corresponding to the first gradient, the target value of the rotation speed of the rotor (Dfan) or the first fan speed modification target value (Dsfan) is selectively outputted depending on a logical value of an external abrupt start signal as a selected fan speed target value (Dsfan'), a ratio of a reference data (Dref) representing a magnitude of a center voltage of a power supply voltage of the motor to a voltage input data (Dacc) from a power supply voltage input (Dref/Dacc) is detected and the corrected target value of the fan speed (Dref/Dacc× Dsfan'=Dsfan") to the switching device is outputted in the form of the rotational drive signal.

13. An apparatus for controlling a rotation speed of a brushless motor as claimed in claim 12, further comprising calculating a second fan speed modification target value (Dsfan) with respect to the unit time when the previously detected duty ratio of the previously inputted rotate command signal is in excess of 0% and the presently detected duty ratio of the presently inputted rotate command signal is lower than the previously detected duty ratio of the previously inputted rotate command signal, the second fan speed modification target value (Dsfan) with respect to the unit time corresponding to the second gradient.

14. A method for controlling a rotation speed of a brushless motor as claimed in claim 13, wherein the second fan speed modification target value corresponds to 100%/Sec.

* * * * *